June 10, 1947.  A. G. COOLEY  2,421,925
SLIP-FRICTION COUPLING
Filed Sept. 11, 1943
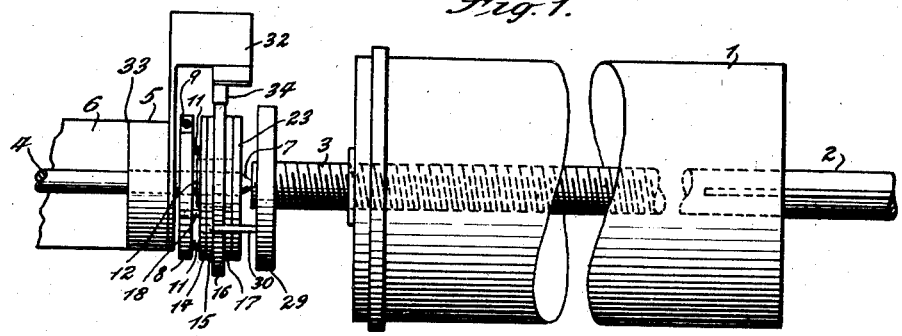
Fig. 1.
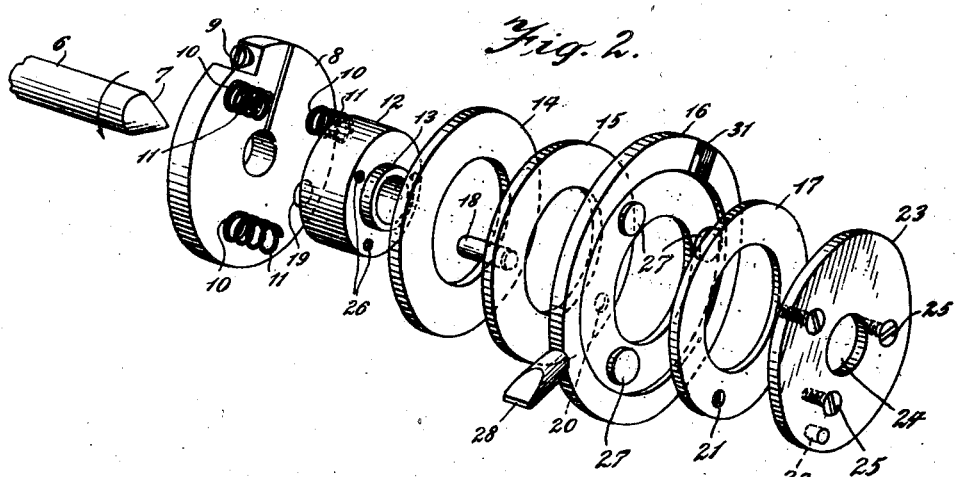
Fig. 2.
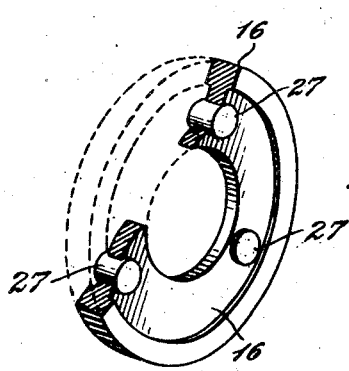
Fig. 3.
Fig. 4.
AUSTIN G. COOLEY
INVENTOR.
BY John J. Rogan
ATTORNEY Patented June 10, 1947

2,421,925

UNITED STATES PATENT OFFICE 2,421,925

SLIP-FRICTION COUPLING

Austin G. Cooley, New York, N. Y., assignor to Times Facsimile Corporation, a corporation of New York Application September 11, 1943, Serial No. 501,953

1 Claim. (Cl. 64—30)

This invention relates to telegraph systems and more especially to improved friction clutches for facsimile machines and the like.

A principal object of the invention is to provide an improved friction-slip clutch for coupling a driving shaft to a facsimile scanning drum and the like.

A feature of the invention relates to an improved friction-slip clutch for facsimile machines which has a very high ratio of static friction to sliding friction.

Another feature relates to a clutch for facsimile machines and the like employing specially designed friction-coupling surfaces, as a result of which the tendency to creep is substantially eliminated, while at the same time reducing the rapidity of wear between the opposed friction surfaces.

A further feature relates to a friction-slip clutch for telegraph machines and the like employing opposed friction surfaces formed of a porous pressed metal or the like which has its interstices uniformly filled with a lubricating medium such as oil or graphite.

A still further feature relates to an improved friction-slip clutch arrangement which is peculiarly well adapted to meet the special operating conditions of a facsimile scanning drum.

Other features and advantages not specifically enumerated will be apparent after a consideration of the following detailed descriptions and the appended claim.

In the drawing which illustrates one preferred embodiment,

Fig. 1 is a view of a facsimile drum drive control embodying features of the invention.

Fig. 2 is an exploded perspective view of part of Fig. 1, to show the clutch construction more clearly.

Fig. 3 is a partly broken away, perspective view of one of the slip friction rings of Figs. 1 and 2.

Fig. 4 is an axial sectional view of the end of the driving shaft of Fig. 1 to show the clutch construction more clearly.

Referring to the drawing, the numeral 1 represents generically any well-known kind of facsimile scanning drum which is required to be rotated around its longitudinal axis, and also to be bodily moved along that axis. For illustration, the drum 1 is shown slidably keyed at its right-hand end to shaft 2, and in threaded engagement at its left-hand end with the lead screw portion 3 of said shaft. For a more detailed description of the manner of supporting the drum and controlling its rotation and longitudinal movement, reference may be had to U. S. Patent No. 2,138,784.

In certain systems of tele-facsimile, it is necessary to start and stop the scanning drum with a minimum delay in starting and a minimum creepage after stopping. In accordance with the invention, there is provided a special form of slip-friction clutch for achieving the above-noted results. For this purpose, the drum shaft 2 which is mounted in suitable bearings (not shown), has supported in alignment therewith a driving shaft 4, which is mounted in ball bearings in bearing bracket 6. Shaft 4 at its right-hand end is pointed as indicated by numeral 7, and engages a central recess in the extreme left end of lead screw 3.

Surrounding shaft 6 is a split disc 8 of suitable metal which by means of screw 9 can be rigidly fastened to the shaft at any desired point thereof. Disc 8 has a set of three equally spaced recesses 10 in one face in which are seated the coiled springs 11. Also fastened to shaft 6 by pins or other means, is a bearing sleeve 12 having a reduced collar 13 at one end. The outside diameter of sleeve 12 is sufficiently small to allow considerable clearance between its circumference and the springs 11. Adapted to surround the sleeve 12 are the friction discs or rings 14—17. The outer face of sleeve 12 provides a journal bearing surface for the friction disc 16. Ring 14 is of metal and abuts against springs 11 to distribute equally the pressure on rings 15, 16 and 17.

Ring 14 is positively driven by member 8, and for this purpose it carries a coupling pin 18 which is adapted to enter the opening 19 in disc 8, it being understood that pin 18 clears sleeve 12. The pin 18 also extends slightly beyond the right-hand face of ring 14 so as to enter a circular recess 20 in the left-hand face of the friction disc 15. The ring 16 is of suitable metal larger in outside diameter than members 14, 15 and 17, and has its opposite faces annularly recessed with the recesses of slightly greater diameter than the outside diameter of the rings 15 and 17. Ring 17 on its right-hand face is provided with a shallow recess 21 which is engaged by a pin 22 on the left-hand face of the cover plate 23. Plate 23 has a central opening 24 which fits over the collar 13. The plate 23 is fastened in place by screws 25 which enter the corresponding threaded openings 26 in the bearing sleeve 12.

In accordance with one feature of the invention, the discs 15 and 17 are of porous compressed metal, the interstices of which are filled with a suitable lubricating medium such as oil, graphite or the like. The rings 15 and 17 may be made of copper, bronze or even of iron. Cooperating with the opposed faces of slip-fraction rings 15 and 17, are a series of three equally spaced friction plugs 27, which are snugly fitted into corresponding holes in the recessed annular portion of ring 16. These plugs 27 can be fastened in place by peening the surrounding margins of the holes in member 16 so as to prevent dislodgment or turning of the said plugs. Plugs 27, in accordance with the invention, are made of the same material as the rings 15 and 17, namely of compressed powdered metal which contains in its interstices a supply of lubricating medium. With this arrangement therefor, the rings 15 and 17 abut against the opposite faces of the plugs 27 to control the friction and slippage. One method of making the material for the friction surfaces of members 15, 17 and 27, is to subject finely comminuted iron, copper or bronze under heavy pressure, for example 15,000 lbs. to about 50,000 lbs. per square inch in a suitable mold to form the powdered metal into a relatively hard compacted mass. By regulating the fineness or coarseness of the original comminuted metal the desired degree of friction in the finished surface may be attained. The compacted mass may then be subjected to a suitable heat treatment and then submerged in lubricating oil to saturate the compacted mass uniformly throughout its porous interior. The compacted and self-lubricating mass may then be subjected to any suitable machining operation to give it the desired final shape and size.

The ring 16 is the stop ring, and for this purpose its periphery has rigidly attached thereto a stop-lug 28. For the purpose of coupling the ring 16 to the shaft 2, the latter shaft has keyed thereto a disc 29 and a rigid pin 30 which engages the recess 31 in ring 16. Consequently, as long as ring 16 is rotating, it positively drives the shaft 2. However, when it is desired to stop the rotation of shaft 2, a suitable trip magnet 32 fastened to the bracket 33 is deenergized to project a stop member 34 in the path of the lug 28. Under these conditions, the ring 16 is positively stopped but because of the slip friction engagement between the plugs 27 and the rings 15 and 17, the driving shaft 4 continues in operation. By reason of the three springs 11 and the intervening rigid ring 14, the frictional pressure is equalized on the plugs and discs in any position of the disc 16, and this equalization of pressure is maintained regardless of slight variations in alignment between shafts 4 and 2. Furthermore, by the use of the separate friction plugs 27, uneven wearing on the faces of the friction rings 15 and 17 is minimized.

The manner of assembly of the various elements, it is believed, will be clear from the foregoing description. Suffice it to say that after fastening the cover plate 23 in place and with the rings 14, 15, 16 and 17 in place on the sleeve 12, the ring 8 may be adjusted to give the proper pressure through the springs 11 whereupon the screw 9 can be fastened to anchor the said ring 8 in position on shaft 6 to maintain the desired pressure.

While one specific embodiment has been disclosed, it will be understood that various changes and modifications may be made without departing from the spirit and scope of the invention.

What I claim is:

A slip-friction clutch for telegraph machines comprising a pair of annular driving discs having frictional opposed surfaces consisting of compacted powdered metal incorporating lubricating material and an intervening driven disc, said driven disc having its opposite faces annularly recessed, and a plurality of metal plugs passing through said recessed portion and extending from opposite sides thereof into engagement with said pair of driving discs, the surfaces of said plugs being of substantially the same material as said driving discs.

AUSTIN G. COOLEY.

REFERENCES CITED

The following references are of record in the file of this patent:

UNITED STATES PATENTS

| Number | Name | Date |
|---|---|---|
| 2,277,107 | Imes | Mar. 24, 1942 |
| 2,295,572 | Finch | Sept. 15, 1942 |
| 2,339,133 | Artzt | Jan. 11, 1944 |
| 1,734,598 | Schramm | Nov. 5, 1929 |
| 2,003,766 | Zwicky | June 4, 1935 |
| 1,365,732 | Schmid et al. | Jan. 18, 1921 |
| 1,594,054 | Fiego | July 27, 1926 |
| 1,832,488 | Larrabee | Nov. 17, 1931 |
| 2,050,542 | Pace | Aug. 11, 1936 |

FOREIGN PATENTS

| Number | Country | Date |
|---|---|---|
| 533,842 | Great Britain | 1941 |
| 143,096 | Switzerland | 1931 |
| 286,183 | Great Britain | 1928 |